R. A. CROSBY AND E. L. COLSON.
COMBINATION STEERING DEVICE AND GAUGE.
APPLICATION FILED SEPT. 6, 1921.
1,412,454.
Patented Apr. 11, 1922.
3 SHEETS—SHEET 2.
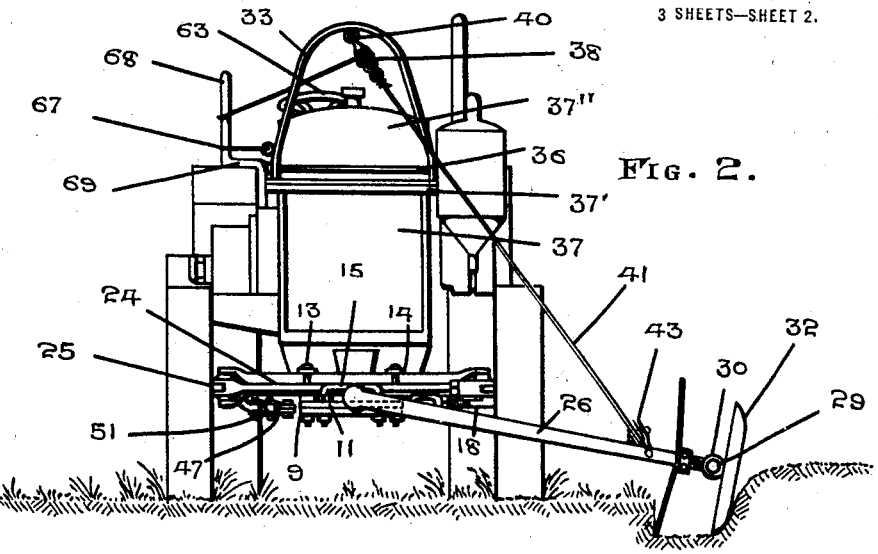
Fig. 2.
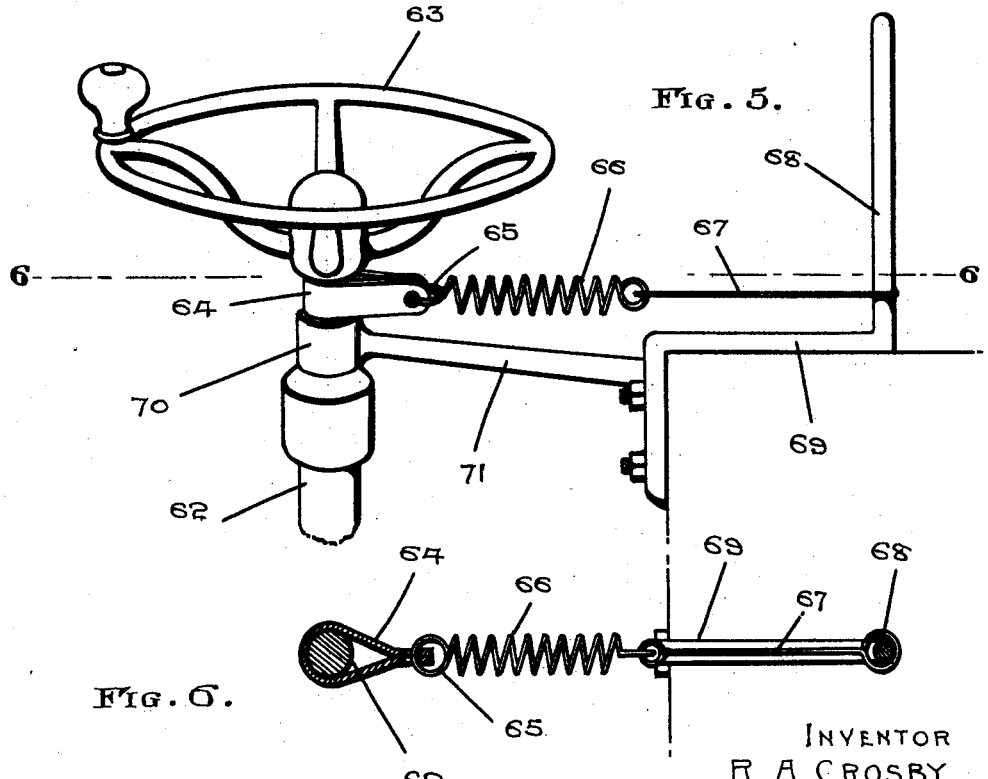
Fig. 5.
Fig. 6.
INVENTOR
R. A. CROSBY AND
E. L. COLSON
by W. J. FitzGerald & Co.
ATTORNEY

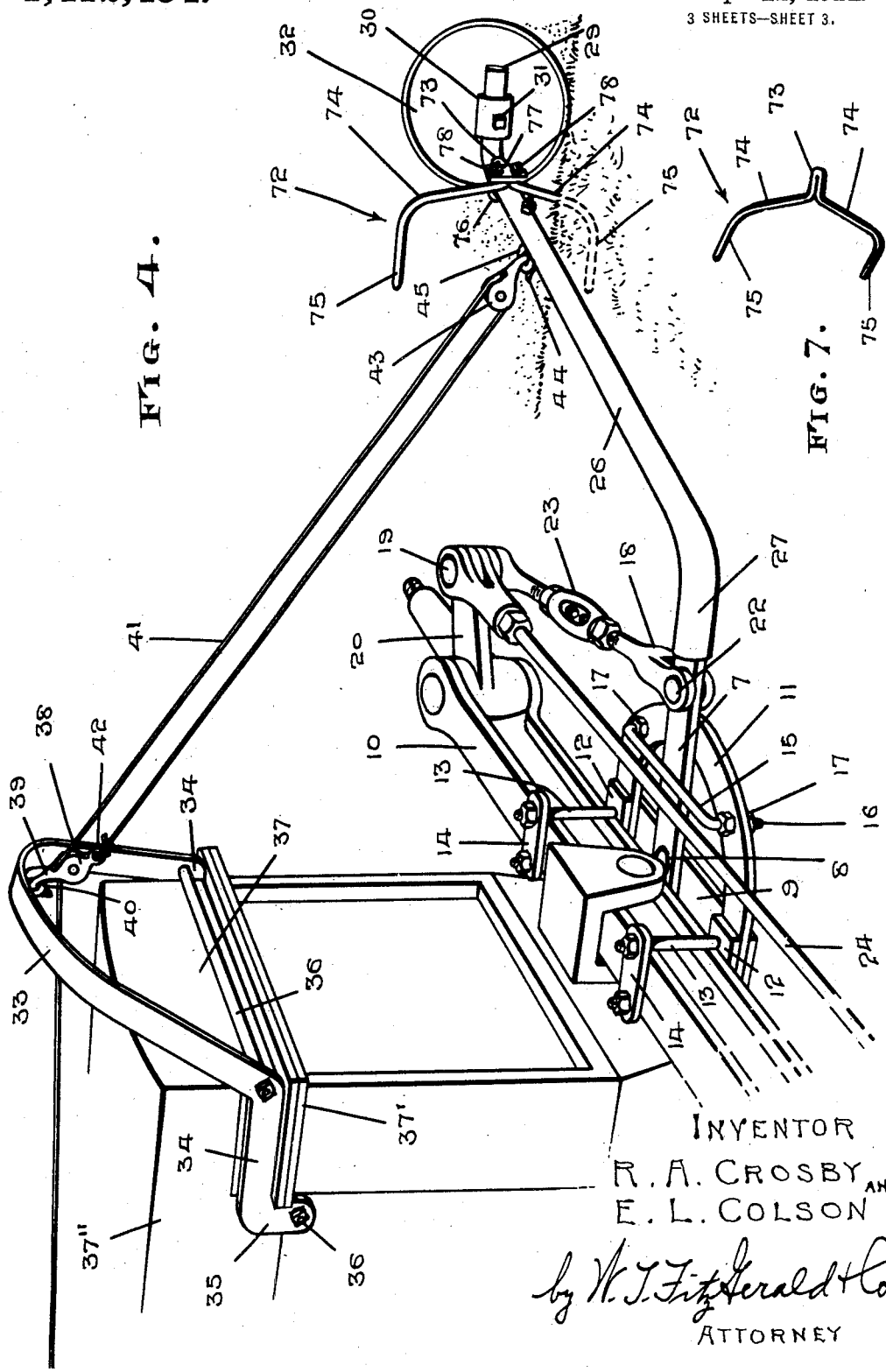

UNITED STATES PATENT OFFICE.

RAYMOND A. CROSBY AND EDD L. COLSON, OF HAMLET, NEBRASKA.

COMBINATION STEERING DEVICE AND GAUGE.

1,412,454.  Specification of Letters Patent.  Patented Apr. 11, 1922.

Application filed September 6, 1921. Serial No. 498,648.

*To all whom it may concern:*

Be it known that we, RAYMOND A. CROSBY and EDD L. COLSON, citizens of the United States, residing at Hamlet, in the county of Hayes and State of Nebraska, have invented certain new and useful Improvements in Combination Steering Devices and Gauges; and we do hereby declare the following to be a full, clear, and exact description of the invention, such as will enable others skilled in the art to which it appertains to make and use the same.

This invention relates to an automatic steering device and gauge for tractors used for listing corn, plowing, and the like, and is an improvement over the device disclosed in our copending application filed October 6, 1920, Serial No. 415,152.

One of the objects of the invention is the provision of means for raising the pilot member including novel means attachable to the radiator or other supporting member of the tractor, for the convenient and efficient application of such means to the tractor.

Another object is the provision of a novel secondary pilot or guide member cooperable with the pilot disk, for the efficient operation of the pilot device under varying conditions of the ground over which the tractor passes.

A further object is the provision in combination with the automatic steering means or pilot device and a yieldable connection between the hand control of the steering gear and wheels, of novel means for retaining the hand control in neutral position to avoid interference with the automatic steering of the tractor under the control of the pilot device.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 2 is a front view thereof.

Fig. 3 is a perspective view of the yieldable connection.

Fig. 4 is a perspective view of the steering device.

Fig. 5 is an enlarged elevation of the friction device for holding the hand control of the steering gear in neutral position.

Fig. 6 is a section on the line 6—6 of Fig. 5.

Fig. 7 is a perspective view of the secondary pilot or guide member.

Figure 1:
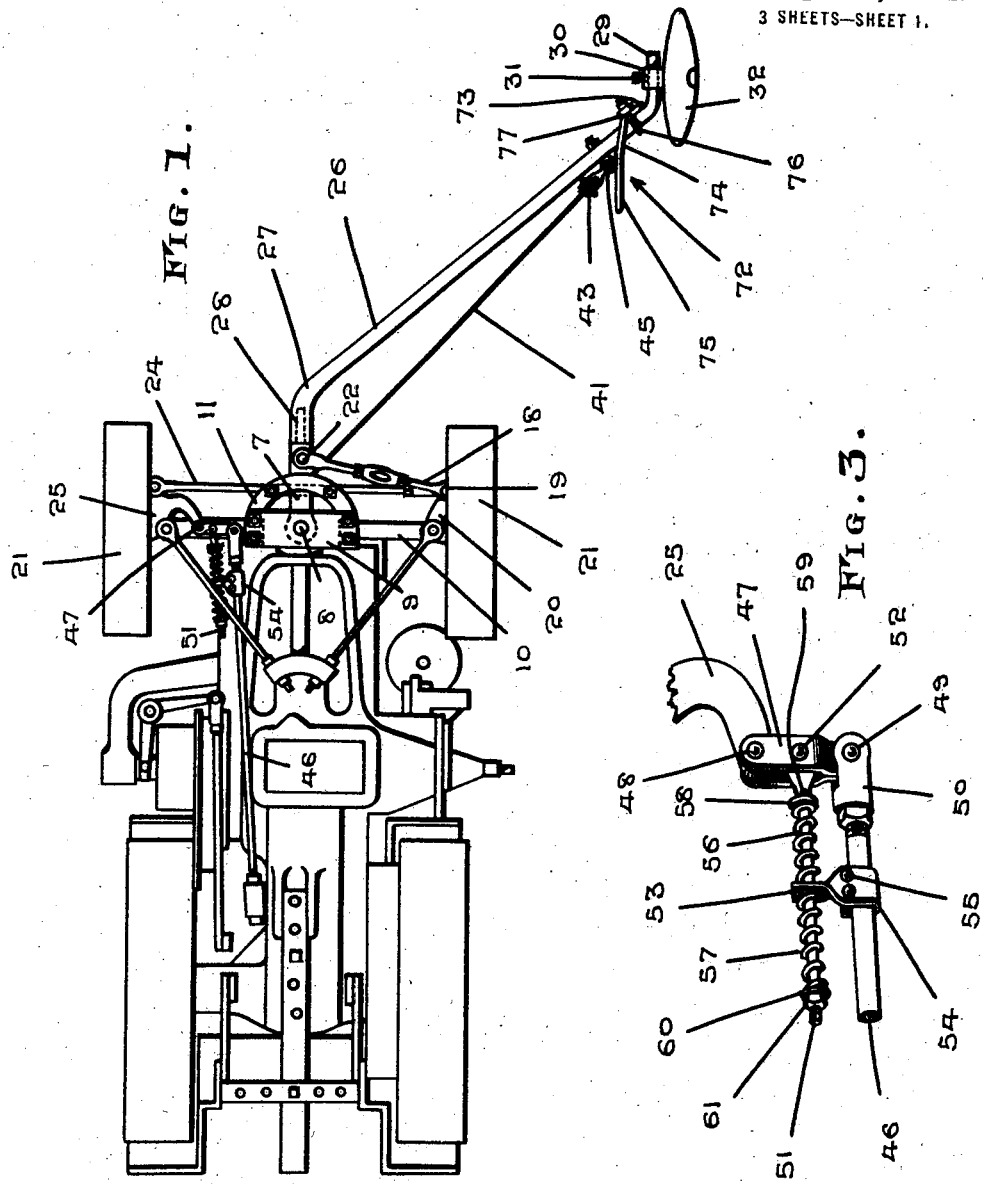
Figure 1 is a bottom plan view showing the improvements as applied to a tractor.

The general construction is similar to that disclosed in the aforesaid application, and the steering device comprises a forwardly-projecting lever 7 pivoted, as at 8, at its rear end on a transverse plate 9 which is secured to the front axle 10 of the tractor, and said lever extends across and bears slidably on a guide segment 11, having its end portions overlapping the plate 9, and spacers 12 are disposed between the segment 11 and axle 10. Clamping bolts 13 extend through the plate 9, segment 11, and spacers 12 and also engage through members 14 bearing on and extending across the axle, whereby to clamp said parts to the axle. A transverse guide rod 15 extends across the lever 7 and holds it down on the segment 11, and the end portions 16 of the rod 15 extend downwardly at an angle through the segment, and are secured thereto by means of nuts 17 on said end portions. The lever 7 is thus guided for oscillatory movement from side to side, and is operatively connected with the steering gear as will presently appear.

The operative connection between the lever 7 and said steering gear includes a link 18 having one end engaging the pivot 19 carried by one steering knuckle 20 pivoted to one end of the axle 10, and a steering knuckle 25 is pivoted to the opposite end of the axle, on which knuckles the wheels 21 are rotatable, and said knuckles are connected by the rod or link 24 whereby both wheels 21 are angled simultaneously, as usual. The pivot 19 is the one that connects the rod 24 with the knuckle 20, and by using a longer one, can also be used for connecting the link 18 with said knuckle. The opposite end of the link 18 is pivoted to the lever 7, as at 22, whereby the lever 7 in swinging, will swing the knuckle 20 correspondingly, for steering the tractor. The link 18 comprises two sections connected by a turn buckle 23, whereby said link can be adjusted in length, to properly position the lever 7 and knuckle 20 relatively to one another.

A pilot member is attached to the arm or lever 7, for automatically controlling the steering gear, and comprises a pole 26 extending obliquely forward from the lever, and the rear end of said pole is bent at an angle and projects rearwardly, as at 27, and is tubular and fitted for rotation on the forward terminal 28 of the lever 7, permitting the forward terminal 29 of the pole to move upwardly and downwardly, and also enabling said pole to be swung from one side to the other for changing from right hand to left hand control, and vice-versa. The forward terminal 29 of the pole 26 is also bent at an angle and projects longitudinally forward, and a collar or clamp 30 is fitted adjustably on the terminal 29 and is secured in its adjusted position by means of a set screw 31, or the like, and a dished or convexed disk 32 is carried for rotation by the collar 30 and is adapted to bear at its convex outer side against the turned side of the last or nearest furrow.

Means is provided for raising or hoisting the pole 26, to lift the pilot member from the ground, and, for this purpose, a forwardly-inclined arch 33 is provided, and is adapted to be secured to the radiator 37 or other similar upright support at the front end of the tractor. As shown, the arch 33 has clamping portions 34 extending rearwardly from the lower ends of the arch to be disposed at the opposite sides of the radiator or support 37, and the portions 34 have depending extensions 35 at their rear ends. Cross rods or bolts 36 are engaged through the extensions 35 and through the terminals of the arch at the junctures of the arch and portions 34, so that said rods extend across the front and rear of the radiator. The portions 34 can seat on flanges 37' or other portions on the sides of the radiator to assist in positioning and supporting the arch, and the extensions 35 will enable the cross rod 36 to be sufficiently low down to extend under a portion 37'' extending rearwardly from the top portion of the radiator, as in some tractors on the market. The crest of the arch extends upwardly higher than the top of the radiator, and a sheave 38 is suspended from the crest of the yoke, said sheave having a hook 39 engaging through a loop or eye 40 depending from the crest of the yoke. A cable or rope 41 has one end anchored to the sheave 38, as at 42, and passes through a second sheave 43 connected to the pole 26 and the cable 41 then passes back through the sheave 38 and thence rearwardly to a point where the operator can pull said cable and thereby raise the pole 26 from either side, to lift the disk 32 off of the ground. The sheave 43 has a hook 44 engaging an eye 45 secured to the pole 26 between the ends thereof.

In order that the wheels 21 can be angled for purpose of steering the tractor automatically, without the interference of the manual control, a yieldable connection between said manual control and steering knuckles is provided. Ordinarily, the manually-controlled steering rod 46 is pivoted to the knuckle 25, but, in carrying out the present invention, a yieldable connection between the rod 46 and knuckle 25 is used, including a pair of transverse bars 47 pivoted at one end, as at 48, to the knuckle 25, and at the other end, as at 49, within the fork 50 on the forward end of the rod 46, whereby providing for forward and rearward motion of said rod 46 and knuckle 25 relatively to one another. A longitudinal rod 51 parallel with the rod 46, has its forward end 52 pivoted to and located between the bars 47, between the pivots 48 and 49, and said rod 51 is slidable through the projecting and twisted end 53 of a U-shaped clamp 54 embracing the rod 46 and clamped to said rod 46 by means of bolts 55 or the like. Coiled expansion springs 56 and 57 are disposed on the rod 51 in front and in rear, respectively, of the portion 53, and the front spring 57 is confined between the portion 53 and a washer or collar 58 on the rod 51 near the forward end thereof, and retained in place by means of a cotter pin 59 or the like. The rear spring 57 is confined between the portion 53 and a washer 60 on the rod 51 near the rear end thereof and said washer 60 is retained in place by means of a nut 61 threaded on the rear terminal of said rod 51. The clamp 54 can be adjusted on the rod 46, to bring the spring 56 to the desired tension, and the nut 61 can then be adjusted on the rod 50, to bring the spring 57 under corresponding tension, whereby said springs balance one another and tend to maintain the parts in neutral or intermediate position.

With the exception of the yoke 33 and corresponding parts, the mechanism above described is substantially the same as disclosed in the aforesaid application, and the arch 33 is substituted in place of the corresponding members as shown in the aforesaid application, for supporting the sheave 38 or eqivalent member from the radiator or similar support.

In order to retain the hand control of the steering gear in neutral position, to avoid interference with the automatic steering of the tractor when the pilot device is used, a friction device is employed for preventing accidental movement of the hand control due to vibration of the tractor, shocks or jars. The steering rod 46 is controlled, as usual and well known, by a steering shaft 62 having a hand wheel 63 at its upper end for angling the front wheels manually, and, in the arrangement shown, the friction retaining device cooperates with the shaft 62. Thus, a looped strap 64 of leather or other frictional material surrounds the shaft 62 at a suitable point, such as below the wheel 63, and the terminals are apertured and engaged by the end loop or eye 65 of a coiled retractile spring 66 which has its other end anchored, such as by means of a wire 67 or the like, to a post 68 rising from a base 69 secured on the frame or rear wheel fender of the tractor. The spring 66 being under tension, will pull the strap 64 tightly against the shaft 62, and the friction thus created will prevent the accidental turning movement of the shaft 62, thereby retaining the rod 46 in the neutral position to which it has been set for the automatic operation of the steering gear by the pilot device, thereby leaving sufficient slack for the turning movement of the steering wheels 21 in both directions. The friction device will not interfere with the manual steering of the tractor. The strap 64, as shown, is located between the hand wheel 63 and a bearing 70 for the shaft 62 carried by a bracket 71, although the friction device can be applied to any other rotary part of the manual control. The post 68, as shown in Fig. 2, can also be used for tying the cable or cord 41 thereto for supporting the pilot member in raised position.

A secondary pilot or guide member 72 is carried by the pole 26, to render the pilot member more certain in the operation of the tractor over uneven ground, ditches, ruts, and the like. The secondary or auxiliary pilot or guide member 72 is bent from a rod, and is of double formation so as to be right and left handed for the use of the pilot member at either side of the line of movement of the tractor. The member 72 is bent and doubled intermediate its ends to form a doubled shank 73 disposed horizontally at the same angle as the pole 26 to bear against one side of the pole near the forwardly-projecting terminal 29 and pilot disk 32. The member 72 has the portions 74 diverging rearwardly from the shank 73 and extending upwardly and downwardly, and the terminals 75 of the rod are bent to extend longitudinally rearward from the opposite ends of the portions 74. The shank 73 is clamped against the pole 26 by a suitable clamp, such as a U-bolt 76 fitted around the pole opposite to the shank 73 with said shank located between the terminals of the bolt, and a clamping or washer plate 77 fitted on the terminals of the bolt. Nuts 78 are threaded on the terminals of said bolt for clamping the shank 73 between the pole 26 and plate 77, thereby securing the member 72 to said pole, and permitting the adjustment of said member longitudinally along the pole as well as angularly around the pole, to properly position said member. In either position of the pole 26, when extending toward the right or toward the left, one of the portions 74 extends downwardly so that the corresponding lower terminal 75 can ride in the furrow, as seen in Figs. 2 and 4, adjacent to the land side of the furrow, while the disk 32 moves adjacent to or bears against the turned soil. The lower terminal 75 of the member 72 in running along the land side of the furrow will increase the efficiency of the pilot device, preventing the disk 32 from moving away from the turned soil forming the wall or side of the furrow opposite to the tractor.

In operation, when the tractor is being propelled with the pilot disk 32 and member 72 running in the last or nearest furrow, the tractor will be automatically steered, as when listing corn or plowing, and the tractor will therefore move parallel with such furrow at a safe distance therefrom, whereby to serve as a gauge, and relieve the operator of the duty of steering the machine. The disk 32 and member 72 in following the furrow, will position the lever 7 and steering gear accordingly, to guide the tractor, and when turning around or traveling on the road, the pilot member can be raised, by pulling the cable 41, so as not to interfere with the movement of the tractor, and such hoisting means also facilitates the raising of the pole 26 for swinging it from one side to the other. When the steering gear is controlled by the pilot member, the knuckle 25 can move without necessity of the rod 46 moving, inasmuch as the bars 47 can swing with the knuckle 25 thereby reciprocating the rod 51, and when said rod is moved forwardly, the spring 57 is compressed, whereas when the rod is moved rearwardly, the spring 56 is compressed. This enables the connection between the rod 46 and knuckle 25 to yield, and said springs tend to maintain the steering gear in normal or intermediate position for guiding the tractor straight ahead. The friction retaining device for the manual control will also prevent the accidental movement of the manual control, including the rod 46, which might interfere with the automatic operation of the steering gear. Furthermore, when the pilot member is raised off of the ground, the tractor can be steered manually, by moving the rod 46 forwardly and rearwardly to swing the knuckle 25, it being noted that said rod 46 being connected to the bars 47, and the springs 56 and 57 being disposed between the portions of the rods 46 and 51, will result in the knuckle 25 moving forwardly and rearwardly with the rod 46, with but a slight yielding movement that will not interfere with manual steering. Thus, when the rod 46 is moved forwardly, it moves the bars or links 47 forwardly, and the spring 56 is also compressed to move said bars forwardly, and when the rod 46 is moved rearwardly, the bars 47 are moved by the rod 46 and spring 57. Thus, by the provision of the springs between the rod or actuating member 46 and the links or bars 47 loosely connecting said rod 46 and knuckle 25, the tractor can be steered automatically without interference, and can also be steered manually without difficulty or objection.

Having thus described the invention, what is claimed as new is:—

1. An automatic steering device for a tractor including pilot means having a forwardly extending pole to swing laterally, a clamp fitted adjustably on the forward terminal of said pole, a pilot disk carried by said clamp to move along a furrow opposite to the land side, a member having a portion to extend downwardly into the furrow and a rearwardly-extending terminal to move along the land side, and means for adjustably securing said member on the pole.

2. An automatic steering device for a tractor including pilot means adapted to be disposed in either right or left position and having a disk to run along a furrow opposite to the land side, and secondary means carried by the pilot means constructed and arranged to move in the furrow along the land side in either position of said pilot means.

3. An automatic steering device for a tractor including pilot means having a pole to be disposed in either right or left position, a pilot disk carried by the pole to move along a furrow opposite to the land side, and a secondary pilot member carried by the pole having oppositely-extending portions to move in the furrow along the land side in either position of the pole.

4. An automatic steering device for a tractor including pilot means having a pole to be disposed in either right or left position, a pilot disk carried by the pole to move in the furrow opposite to the land side, and a secondary pilot member secured to the pole having diverging portions to enter the furrow in either position of the pole, said portions having rearwardly-extending terminals to move along the land side of the furrow.

5. An automatic steering device for a tractor including a pole to be disposed in either right or left position, and a pilot member carried by the pole having rearwardly-diverging portions to enter the furrows in the opposite positions of the pole, said portions having rearwardly-extending terminals to move in the furrow.

6. An automatic steering device for a tractor including pilot means having a pole to be disposed in either right or left position, a pilot member formed from a rod having a doubled intermediate shank, portions diverging rearwardly from said shank to extend upwardly and downwardly, and terminals extending rearwardly from said portions to run in the furrow, and a clamp for securing said shank to said pole.

7. An automatic steering device for a tractor including pilot means having a pilot member mounted for upward and downward movement, an arch having terminal portions to fit and bear against a support at the front end of the tractor, means for rigidly securing said terminal portions to said support, and means connected to said pilot member for raising it and supported from and movable relatively to the arch.

8. An automatic steering device including pilot means having a pilot member adapted to be raised and lowered, an arch having terminal portions to be disposed at opposite sides of a support at the forward end of the tractor, means for clamping said terminal portions rigidly to the support and cooperable with said terminal portions to embrace said support and hoisting means connected to said member for raising it and supported from and movable relatively to the arch.

9. An automatic steering device including pilot means having a pilot member to be raised and lowered, an arch having rearwardly-extending terminal portions to be disposed at opposite sides of a support at the forward end of the tractor, means connecting said portions for clamping them on and embracing the support, and hoisting means connected to said arch and pilot member for raising said member.

10. An automatic steering device comprising the combination with the steering gear of a tractor, including a movable member, and a rotary manual control member, of pilot means operatively connected to the steering gear for controlling said movable member, yielding means connecting said manual control and movable members, and friction means engaging said manual control member for retaining same in set position with slack between said movable and manual control members.

11. An automatic steering device according to claim 10 wherein the friction device includes a looped friction strap surrounding said manual control member, and spring means connected to said strap for creating friction between said strap and member.

In testimony whereof we have signed our names to this specification in the presence of two subscribing witnesses.

RAYMOND A. CROSBY.
EDD L. COLSON.

Witnesses:
Jos. M. Crosby,
E. A. Scriven.